United States Patent [19]

Boger

[11] Patent Number: 5,190,264

[45] Date of Patent: Mar. 2, 1993

[54] ADJUSTABLE VALVE PACKING ARRANGEMENT

[75] Inventor: Henry W. Boger, Walpole, Mass.

[73] Assignee: Dresser Industries, Inc., Dallas, Tex.

[21] Appl. No.: 845,306

[22] Filed: Mar. 3, 1992

[51] Int. Cl.⁵ .................. F16K 41/02; F16J 15/54
[52] U.S. Cl. .................. 251/214; 277/64; 277/116.4; 277/106
[58] Field of Search ............ 251/214, 278, 362, 363; 277/64, 116.4, 116.6, 105, 106

[56] References Cited

U.S. PATENT DOCUMENTS

| | | | |
|---|---|---|---|
| 2,049,955 | 4/1936 | Gilbert | 251/214 X |
| 2,853,321 | 9/1958 | Davey | 277/105 X |
| 3,011,808 | 12/1961 | Tucker et al. | 251/214 X |
| 3,968,970 | 7/1976 | Vogeli | 277/106 |
| 4,283,062 | 8/1981 | Catanzaro et al. | 277/12 |
| 4,317,573 | 3/1982 | Karkkainen | 277/113 |
| 4,556,076 | 12/1985 | Bridges | 251/214 X |
| 4,640,305 | 2/1987 | Johnson | 137/312 |
| 4,745,944 | 5/1988 | Francart | 251/214 X |
| 4,773,442 | 9/1988 | Lephilibert | 251/214 X |
| 4,886,241 | 12/1989 | Davis et al. | 251/214 |
| 4,911,408 | 3/1990 | Kemp | 251/214 X |
| 4,972,867 | 11/1990 | Ruesch | 251/214 X |
| 5,056,757 | 10/1991 | Wood | 251/214 |

OTHER PUBLICATIONS

Chesterton Leaflet (copyright 1988).

*Primary Examiner*—Martin P. Schwadron
*Assistant Examiner*—Kevin L. Lee

[57] ABSTRACT

A fluid valve includes a packing element surrounding a valve stem extending through the valve body. A packing flange is adjustably supported on the valve body for moving a follower to compress the packing element. A set of disc springs is supported in a cavity internally of the follower between upper and lower parts to compensate for temperature variations causing volumetric changes in the packing element.

21 Claims, 1 Drawing Sheet

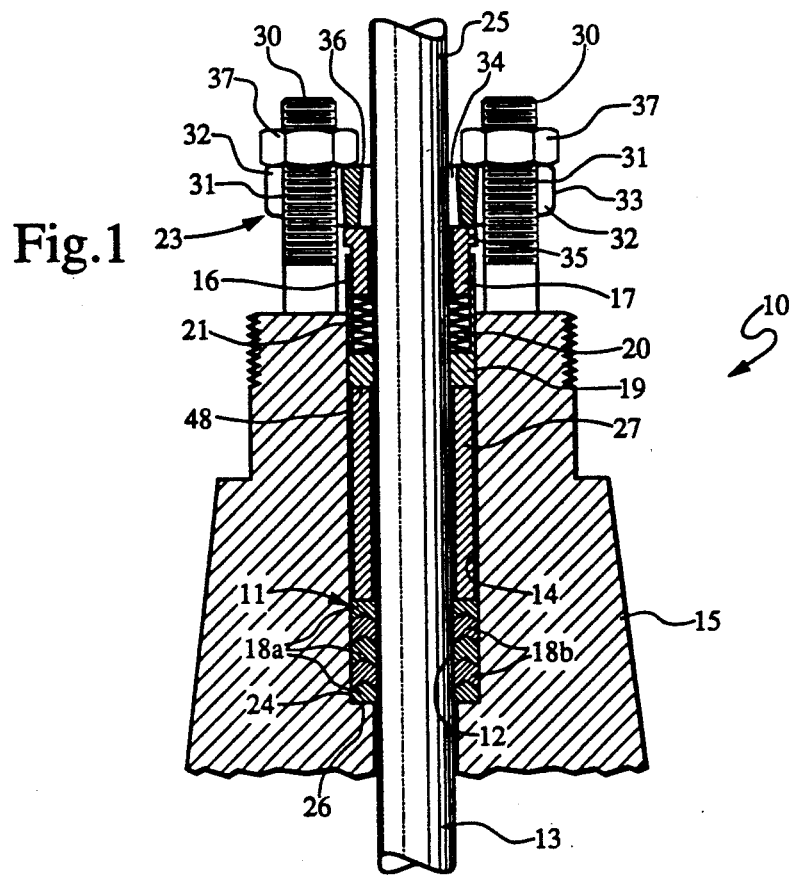
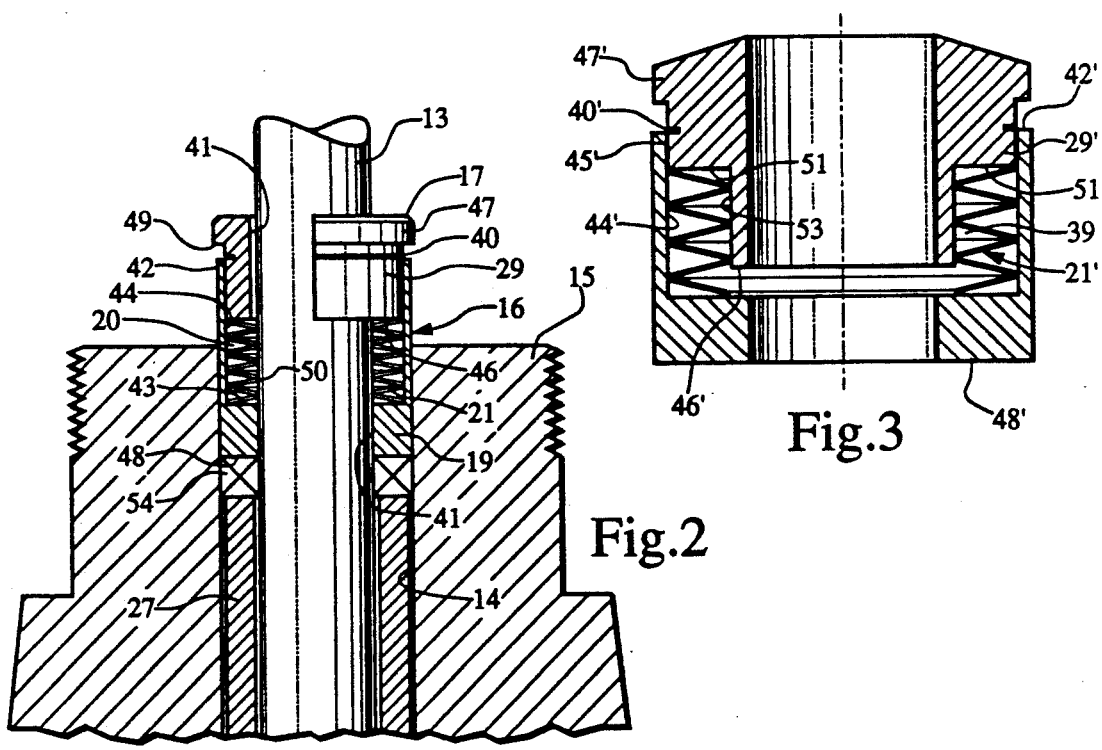

ADJUSTABLE VALVE PACKING ARRANGEMENT

BACKGROUND OF THE INVENTION

1. Technical Field

This invention relates generally to a valve packing arrangement such as may be used around a valve stem to keep fluids from leaking out of the valve along the stem. More particularly, the invention is concerned with a packing arrangement which provides for adjustment in the compression of a packing element between the valve body and the valve stem.

2. Background Information

In meeting the requirements of the Environmental Protection Agency, it is important that fugitive emissions from chemical plants be kept to a minimum. One source of fugitive emissions is the leakage of fluids along the stems of valves used in controlling the process fluids of the plant. Special packing materials such as polytetrafluoroethylene and perfluoroelastomer have been found to meet governmental sealing requirements in reducing fluid losses from valves. Polytetrafluoroethylene, however, suffers from plastic flow under certain conditions requiring that the compression of the packing be adjusted from time to time in order to tightly seal between the valve stem and valve body. On the other hand, perfluoroelastomer seals have more elastomeric properties which at normal operating temperatures do not exhibit plastic flow. However, with temperature increases volumetric swell of perfluoroelastomer packings can cause packing stress in a confined volume and upon cool down may result in fluid leakage.

One prior arrangement valve packing arrangement is shown in U.S. Pat. No. 5,056,757 wherein there is described a live load packing system which includes V-type polytetrafluoroethylene (PTFE) packing rings which are in a loaded condition. Specifically, on each side of the packing rings there is an anti-extrusion ring. One end of a packing follower engages one of the anti-extrusion rings and is urged to compress the packing rings by a series of Bellville disc springs mounted at the other end of the packing follower. The Bellville disc springs are maintained in position on the packing follower by means of an O-ring. A packing flange engageably contacts one end of the Bellville disc springs and packing nuts may be tightened so that the packing flange transmits compressive force to the Bellville disc springs to load the packing rings and seal between the valve stem and valve body.

Another arrangement for loading sealing rings around a reciprocating plunger is shown in U.S. Pat. No. 3,011,808. As shown in FIG. 2 of that patent, a modified loading member is used to bias the sealing rings in the proper manner to effect a more efficient seal for a longer period of time. In the disclosed arrangement, a member includes a rigid main portion with a spring loaded inner ring. The latter is biased by a series of coil springs against a point on the lip of the sealing members when a packing gland is tightened to produce design precompression of the assembly.

SUMMARY OF THE INVENTION

The general aim of the present invention is to provide a new and improved packing arrangement for use in a fluid valve with more effective sealing against fugitive emissions over a longer service life and wider range of temperature conditions for the valve. More specifically, the present invention contemplates the accomplishments of the foregoing to the provision of a novel packing follower uniquely constructed for use with packing elements which experience substantial volumetric changes over the range of likely operating temperature conditions.

Specifically, the invention resides in the provision of an internal set of disc springs in the follower functioning to accommodate increases in packing element volume without harm to the element under increasing temperature conditions and which also will serve to maintain adequate compression in sealing of the element within the valve stem bore and against the valve stem as the volume of the element shrinks with decreases in temperature.

The invention also resides in the provision of a visual indicator on the follower for initially setting the compression of the packing element.

Still further, the invention resides in the provision of a stop acting between parts of the follower to limit spring compression and provide a separate indication of packing element wear for future replacement of the packing element.

Additionally, the follower provides a range of adjustability in compression of the packing element between the initial setting and the stop limiting spring compression so that the amount of compression on the packing element may be adjusted to accommodate wear while still maintaining effective sealing against the valve stem.

The foregoing and other advantages of the present invention will become more apparent from the following description of the preferred embodiment when taken in conjunction with the accompanying drawings.

BRIEF DESCRIPTION OF THE DRAWING

FIG. 1 is a fragmentary cross-sectional view of a valve incorporating the novel features of the present invention.

FIG. 2 is an enlarged cross-sectional view of a valve similar to the valve shown in FIG. 1 but including additional parts in the valve packing arrangement of the present invention.

FIG. 3 is a cross-sectional view of an alternative version of the novel follower incorporated in the packing arrangement of the present invention.

BEST MODE FOR CARRYING OUT THE INVENTION

As shown in the drawings for purposes of illustration, the present invention is embodied in a packing arrangement for a fluid valve 10 such as may be used in a chemical plant for the control of process fluids. Only a portion of the valve 10 shown in FIG. 1 with a valve plug stem 13 extending through a stem bore 14 in a valve body 15. The stem connects in the usual manner with a valve plug (not shown) which may be moved vertically relative to a seat (not shown) to control the process fluids. Surrounding the stem within the valve body is a packing element 11 such as may be comprised of a series of chevron shaped sealing rings 18a and 18b. Preferably, the rings are made of different materials with top, bottom and middle rings 18a comprised of a long carbon fiber filled perfluoroalkoxy material (PFA) such as is sold by E. I. Du Pont De Nemours and Company under the trademark ZYMAXX. Sandwiched between the top, bottom and middle rings are intermediate rings 18b comprised of perfluoroelastomer material such as is sold also by E. I. Du Pont De Nemours and Company under the trademark KALREZ.

For sealing within the valve bore 14, the packing element 11 is compressed by means of a clamping arrangement 23 which is attached to the top of a valve body 15. When compressed, the wall of a central opening 12 of the valve element seals against the outside of the stem 13 and the outer edge of the element seals against the wall of the stem bore 14. For at least initially compressing the sealing element 11, the clamping arrangement 23 includes a support or packing flange 33 extending across the stem bore 14 and secured to the valve body 15 by means of a pair of studs 30. In mounting the flange on the valve body, the valve stem extends through a central opening 34 in the flange with threaded outer end portions 31 of the studs projecting through U-shaped notches 32 in opposite ends of the flange 33. When threaded downwardly onto the outer end portion of the studs, nuts 37 engage the upper side 36 of the flange and urge the flange downwardly. Engaging the underside 35 of the flange around the central opening 34 is a packing follower 16 which rides upon the top of a spacer sleeve 27. The lower end of the sleeve abuts the top sealing ring 18a of the packing element 11. As the nuts are tightened, the packing element is sandwiched between the spacer and a shoulder 24 formed in the wall of the bore 14 to cause compression of the sealing rings and expansion radially to effect sealing between the stem and wall of the bore.

In accordance with the primary aim of the present invention, a disc spring assembly 21 is mounted internally of the follower 16 to accommodate changes in the volume of the packing element 11 resulting from a wide range of temperature changes in the operating environment of the valve 10 without a loss in the effectiveness of the seal between the bore 14 and the stem 13. For this purpose, the follower includes upper and lower parts 17 and 19 with an annular cavity 20 in the lower part telescopically receiving a lower end portion 29 of the upper part 17. Between the two parts, the cavity defines a spring chamber which houses the disc spring assembly 21. Advantageously, this arrangement of the spring assembly can be compressed to accommodate substantial expansion in the packing element 11 under high temperature conditions without damage to the sealing rings 18a and 18b and yet the packing element will continue to maintain effective sealing when the sealing rings shrink upon cooling.

In the present invention, the cavity 20 containing the disc spring assembly includes a radially extending bottom wall 43 (see FIG. 2) located between upper and lower ends 42 and 48, respectively, of the lower part 19. The bottom wall 43 extends radially outward from an axial opening 41 for the valve stem to a cylindrical internal wall 44. The inside diameter of the cavity is approximately equal to the diameter of the lower end portion 29 of the upper follower part 17 which is telescoped into the cavity. A radially extending lower end wall 46 of the upper part faces the bottom wall 43 with the portion of the cavity between those two walls defining a chamber for a stacked set of disc springs 21. When inserted into the cavity, the individual spring discs are stacked with adjacent discs alternating cup up and cup down. With this arrangement, the springs are contained entirely within the follower 16 and thus are protected against being fouled by debris from the valve environment.

To limit telescoping of the upper part 17 into the cavity 20, an annular flange 47 is formed integrally with the upper end portion of the upper part. An underside 49 of the flange extends radially outward from a cylindrical outer wall 45 and over the upper end 42 of the lower part 19. The flange thus serves as a stop limiting downward movement of the upper part into the cavity 20. The axially extending length of the outer wall 45 is such that the distance between the underside 49 of the flange and the lower end wall 46 is less than the axially extending length of the internal cylindrical wall 44. When the flange engages the upper end, the size of the spring chamber within the cavity is such as to avoid permanent deformation of the stack of disc springs 21.

In accordance with another feature of the present invention, initial compression of the packing element 11 is set by preselected deformation of the disc springs 21. Advantageously, for this purpose a mark 40 in the form of an annular notch is provided on the outer wall 45 of the upper part 17. The springs are compressed a preselected amount sufficient to squeeze the packing element to the desired extent of sealing between the stem 13 and the bore 14 when the mark is visually aligned with the upper end 42 of the lower part. When initially assembling the packing arrangement in the valve body 15, this is accomplished by tightening the nuts 37 on the studs 30 against the support flange 33 so as to drive the upper part of the follower into the lower part until the notch 40 aligns with the upper end 42 of the lower part. During the service life of the sealing rings 18a and 18b, if leakage is detected around the stem 13, the packing flange 33 may be tightened further outwardly against the upper part of the follower to additionally compress the springs and in turn the packing. When with repeated tightening the stop flange 47 engages the upper end 42 of the lower follower part 19, this will serve as an indication of the need for changing the packing element at the next opportunity. However, it still will be possible to further tighten down against the follower and cause the packing elements to squeeze against the stem to temporarily halt leakage.

While the packing followers 16 illustrated in FIGS. 1 and 2 are identical and have parts identified by the same reference numbers, the packing arrangement shown in FIG. 2 is modified over the arrangement depicted in FIG. 1. As an added safety feature shown in FIG. 2, a fire safe ring 54 is mounted around the stem 13 between the follower 16 and the spacer sleeve 27. The fire safe ring is comprised of a highly fire-resistant flexible graphite material such as is sold under the trademark GRAFOIL sold by UCAR Carbon Company, Inc. The ring acts to restrict the flow of escaping process fluids through the valve stem bore 14 in the event the packing element is melted in a fire.

An alternative version of the follower is illustrated in FIG. 3 wherein like but primed referenced numbers are utilized to identify the same parts. The description and function of the follower 16 shown in FIG. 1 applies equally well to the follower 16', excepting the differences illustrated or as are specifically described herein below, and thus Will not be repeated. The primary difference between the followers 16 and 16' is the provision in the follower 16' of an annular recess 39 which is formed in the upper part 17' and which in conjunction with the cavity in the lower part 19' defines a smaller spring chamber for the disc springs 21'. Specifically, the annular recess 39 is formed in the lower end portion 29' of the upper follower part so as to open both radially outward and axially downward. With this construction, an annular side wall 53 is formed spaced radially inward from the outer cylindrical wall 45'. Also, located between the lower end 46' of the upper part and the flange 47' is a radially extending annular shoulder 51. Herein, the combined axial length of the cylindrical wall 45' and the annular side wall 53 is less than the axial length of the internal cylindrical wall 44' of the cavity 20'. Thus, when the disc spring set 21' is fully compressed, the upper end 42' of the lower part 19' engages the underside 49' of the flange 47'.

Thus, it is seen from the foregoing that the present invention brings to the art an improved valve packing arrangement which by virtue of the follower 16 with internal disc springs 21 is useful particularly with the packing element 11 to maintain effective sealing against the escape of process fluids from the valve 10 without the packing element being harmed due to volumetric increases or leakage when the packing shrinks upon cooling. Moreover, a visual indicator of the appropriate initial compression of the springs is provided by alignment of the notch 40 with the upper end 42 of the lower part 19 of the follower.

I claim:

1. In a fluid valve including a packing element for sealing an annular space between a valve stem and the wall of a bore in a valve body through which said stem extends, the improvement comprising a follower with upper and lower generally cylindrical telescoping parts, said lower part being telescoped into said annular space and having a cavity telescopingly receiving a portion of the upper part, said cavity defining an enclosed spring chamber between the upper and lower parts isolated from said wall and the environment surrounding said valve when telescoped together, a disc spring mounted within said spring chamber, and an adjustable support extending across said bore and being connected between said valve body and said upper part of said follower, said disc spring acting between said upper and lower parts of said follower to yieldably compress said packing element.

2. A fluid valve including a valve body, a stem bore of preselected diameter with a cylindrical wall formed in said body and opening from one side of said body, a packing shoulder in said body within said bore wall, a valve stem extending through said bore past said shoulder and having an outer end portion protruding from said body, said stem being of a diameter smaller than said preselected bore diameter and defining an annular space between the outside diameter thereof and said bore wall, a pacing element located in said bore within said annular space and having one end disposed against said shoulder for sealing against fluid leakage to the outside of said body between said stem and said bore wall, a spacer sleeve having an inside diameter larger than the diameter of said stem and an outside diameter smaller than said preselected diameter, said spacer sleeve being telescoped into said bore around said stem and into engagement with said packing element, a follower with upper and lower telescoping parts, said lower part having a cavity telescopingly receiving a portion of the upper part, said cavity defining an enclosed spring chamber, a disc spring mounted within said spring chamber and urging said upper and lower parts of said follower away from each other, a pair of studs connected to said body and protruding outwardly therefrom on opposite sides of said bore opening and having threaded outer end portions, an adjustable support flange mounted on said studs and extending across aid bore, said flange having a central opening therein with said stem extending therethrough and an underside in engagement with said upper follower part and a top side facing away from said valve body, nuts threaded one onto each of said studs and into engagement with said top side for adjustably locating said flange toward and away from said body to adjust the extent of initial compression of said packing element, and said disc spring acting between said upper and lower parts of said follower to yieldably compress the packing.

3. A fluid valve including a valve body, a stem bore of preselected diameter with a cylindrical wall formed in said body and opening from one side of said body, a packing shoulder in said body within said bore wall, a valve stem extending through said bore past said shoulder and having an outer end portion protruding from said body, said stem being of a diameter smaller than said preselected bore diameter and defining an annular space between the outside diameter thereof and said bore wall, a packing element located in said bore within said annular space and having one end disposed against said shoulder for sealing against fluid leakage to the outside of said body between said stem and said bore wall, a spacer sleeve having an inside diameter larger than the diameter of said stem and an outside diameter smaller than said preselected diameter, said spacer sleeve being telescoped into said bore around said stem and into engagement with said packing element, a follower with generally cylindrical upper and lower telescoping parts, said lower part having a cavity telescopingly receiving a portion of the upper part, an annular recess in the upper part defining an enclosed chamber between the upper and lower parts when telescoped together, said cavity and said annular recess defining a spring chamber, a disc spring mounted within said spring chamber and urging said upper and lower parts of said follower away from each other, a pair of studs connected to said body and protruding outwardly therefrom on opposite sides of said bore opening and having threaded outer end portions, an adjustable support flange mounted on said studs and extending across said bore, said flange having a central opening therein with said stem extending therethrough and an underside in engagement with said upper follower part and a top side facing away from said valve body, nuts threaded one onto each of said studs and into engagement with said top side for adjustably locating said flange toward and away from said body to adjust the extent of initial compression of said packing element, and said disc spring acting between said upper and lower parts of said follower to yieldably compress the packing.

4. A follower insertable into the valve stem bore of a valve body around the valve stem for resiliently compressing a packing element captured within the bore and around the stem to accommodate changes in the compressibility of the packing element over its service life, said follower comprising upper and lower generally cylindrical parts each having an axial opening therethrough for receiving said stem, said lower part including an upwardly facing upper end with an annular cavity formed therein concentrically relative to said opening, said cavity being of a diameter greater than said opening and having a radially extending bottom wall and an internal generally cylindrical wall spaced radially outwardly of said opening, said upper part having an axially extending cylindrical outer wall and a radially extending lower end wall of a diameter sized to telescope into said cavity, and a radially outwardly extending annular flange integrally formed with said outer wall at the upper end thereof, said flange having an underside engageable with said upper end of said lower part to limit the extent of telescoping of said upper part into said lower part, said radial wall of said upper part being spaced axially from the bottom wall of said cavity when said flange is in engagement with said upper end, a spring chamber defined within said lower part between said bottom wall thereof and said lower end wall of said upper part, and a disc spring having a central hole of a diameter larger than the diameter of said stem and insertable into the spring chamber to yieldably urge said upper and lower follower parts away from each other.

5. A follower as defined in claim 4 including a mark formed on said outer wall of said upper part and spaced a selected distance below said flange for alignment with said upper end of said lower part for indicating a selected magnitude of compression of said disc spring.

6. A follower as defined by claim 5 wherein said mark is a notch formed in said outer wall and extending in a circumferential direction at least partially around said outer wall.

7. A follower as defined by claim 4 including an annular groove formed in said lower end wall and opening both downwardly and radially outwardly from said upper part, said groove defining an radially extending annular shoulder spaced axially between said flange and said lower end wall, said groove having a cylindrical inner side wall of a diameter less than the diameter of said hole through said disc spring, said lower end wall being spaced axially from said flange a distance less than the axial distance between the bottom of said cavity and the upper end of said bottom part.

8. A follower as defined in claim 7 including a mark formed on said outer wall of said upper part and spaced a selected distance below said flange for alignment with said upper end of said lower part for indicating a selected magnitude of compression of said disc spring.

9. A follower as defined by claim 8 wherein said mark is a notch formed in said outer wall and extending in a circumferential direction at least partially around said outer wall.

10. An assemblage adjustably compressible by a clamping arrangement on the body of a fluid valve for sealing the annular space around a valve stem of predetermined diameter extending through a larger diameter bore in the body against the loss of fluid from the body along the stem, said assemblage including a cylindrical packing element having a central opening therethrough for receiving said stem, said element being of a diameter sized to fit within said bore and being compressible and expandable radially when compressed to seal against both said stem and the wall of said bore, a spacer sleeve having an inside diameter larger than the diameter of said stem, an outside diameter smaller than said bore diameter and being insertable in said bore around said stem and into engagement with said packing element, a generally cylindrical follower insertable into said bore against said spacer for being clamped therein by said clamping arrangement for urging said spacer sleeve against said packing element, said follower including upper and lower parts, said lower part having a cavity for telescopingly receiving a portion of the upper part, said cavity defining an enclosed spring chamber separable from the wall of the bore, and a set of disc springs to be stacked within said spring chamber with adjacent ones of said springs cupped in opposite directions for urging said upper and lower parts of said follower away from each other for yieldably compressing said packing element.

11. An assemblage as defined by claim 10 including a stop acting between said upper and lower parts and limiting the extent to which said upper part may be telescoped into said lower part.

12. An assemblage as defined by claim 11 further including a fire safe ring sized to fit within said bore and around said stem between said follower and said spacer.

13. An assemblage as defined by claim 11 wherein said lower part includes an upwardly facing upper end with an annular cavity formed therein, said cavity being sized to receive said disc springs and including a radially extending bottom wall and an internal generally cylindrical wall, said upper part having an axially extending cylindrical outer wall and a radially extending lower end wall of a diameter sized to telescope into said cavity.

14. An assemblage as defined by claim 13 with said stop comprising a radially outwardly extending annular flange integrally formed with said axially extending wall at the upper end thereof, said flange having an underside engageable with said upper end of said lower part to limit the extent of telescoping of said upper part into said lower part with said radial wall of said upper part being spaced axially from the bottom wall of said cavity when said flange is in engagement with said upper end.

15. An assemblage as defined in claim 14 including a mark formed on said outer wall of said upper part and spaced a selected distance below said flange for alignment with said upper end of said lower part for indicating a selected magnitude of compression of said disc springs.

16. An assemblage as defined by claim 15 wherein said mark is a notch formed in said outer wall and extending in a circumferential direction at least partially around said outer wall.

17. An assemblage as defined by claim 14 including an annular groove formed in said lower end wall and opening both downwardly and radially outwardly from said upper part, said groove defining an radially extending annular shoulder spaced axially between said flange and said lower end wall, said groove having a cylindrical inner side wall of a diameter less than the diameter of said hole through said disc spring, said lower end wall being spaced axially from said flange a distance less than the axial distance between the bottom of said cavity and the upper end of said bottom part.

18. An assemblage as defined by claim 10 wherein said cylindrical packing element comprises a stacked first and second sealing rings, said first ring being formed of a long carbon fiber filled perfluoroalkoxy material and said second ring being formed of perfluoroelastomer material.

19. A fluid valve including a valve body, a stem bore of preselected diameter with a cylindrical wall formed in said body and opening from one side of said body, a packing shoulder in said body within said bore wall, a valve stem extending through said bore past said shoulder and having an outer end portion protruding from said body, said stem being of a diameter smaller than said preselected bore diameter and defining an annular space between the outside diameter thereof and said bore wall, a packing element located in said bore within said annular space and having one end disposed against said shoulder for sealing against fluid leakage to the outside of said body between said stem and said bore wall, a generally cylindrical follower with first and second telescoping parts inserted into said bore above said packing element, said first part having a cavity telescopingly receiving a portion of said second part, said cavity defining a spring chamber, a spring arrangement mounted within said spring chamber and urging said first and second parts of said follower away from each other, a clamping arrangement mounted on said valve body and including an axially adjustable member and a separate support flange in engagement therewith and extending across said bore, said flange having a central opening therein with said stem extending therethrough and an underside in engagement with said follower, said adjustable member being selectively movable to position said flange toward and away from said body for adjusting the extent of initial compression of said packing element, and said spring arrangement acting between said first and second parts of said follower to yieldably compress said packing element.

20. A fluid valve as defined by claim 19 including a spacer sleeve telescoped into said bore around said stem between said follower and said packing element.

21. A fluid valve as defined by claim 20 including a fire safe ring sized to fit within said bore and around said stem between said follower and said spacer.

* * * * *